March 22, 1955 A. R. BARTON 2,704,722
TEMPERING MEANS AND METHOD FOR MATERIAL
IN A PLASTIC CONDITION
Filed March 22, 1952 4 Sheets-Sheet 2

INVENTOR.
Albert R. Barton
By Gary, Desmond & Parker
Attys.

March 22, 1955  A. R. BARTON  2,704,722
TEMPERING MEANS AND METHOD FOR MATERIAL
IN A PLASTIC CONDITION
Filed March 22, 1952  4 Sheets-Sheet 4
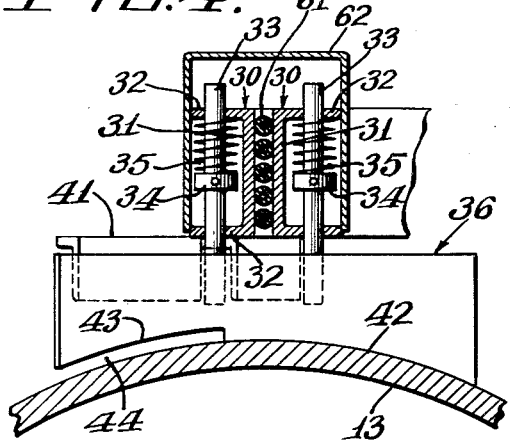
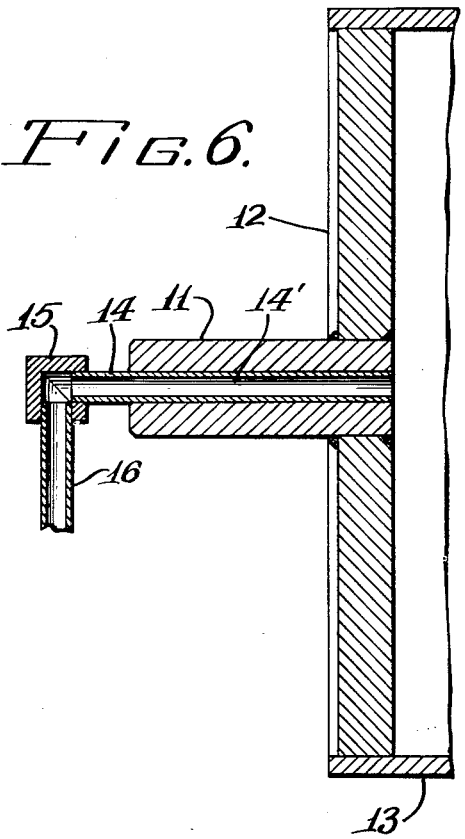
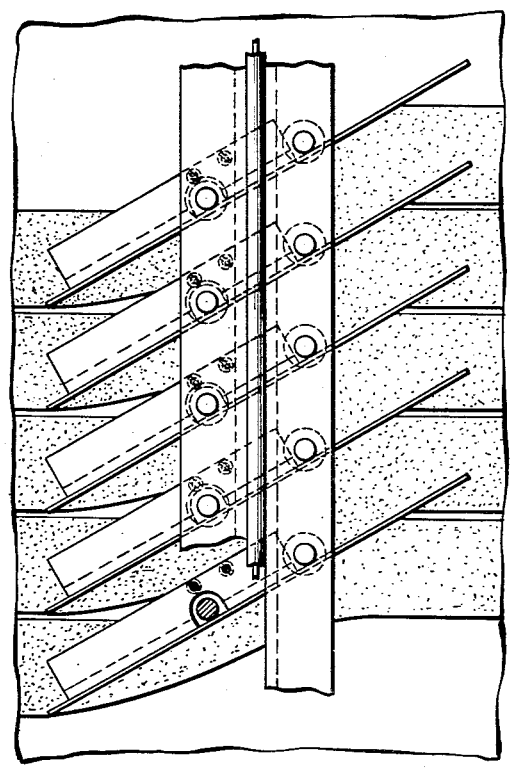
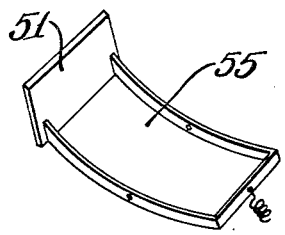
INVENTOR.
Albert R. Barton
By Gary, Desmond & Parker
Attys.

United States Patent Office 2,704,722
Patented Mar. 22, 1955

2,704,722

TEMPERING MEANS AND METHOD FOR MATERIAL IN A PLASTIC CONDITION

Albert R. Barton, Chicago, Ill., asssignor to E. J. Brach & Sons, Chicago, Ill., a corporation of Illinois Application March 22, 1952, Serial No. 278,103

11 Claims. (Cl. 99—23)

This invention relates to improvements in an apparatus for tempering thermoplastic materials and refers particularly to an apparatus for tempering materials, such as heated chocolate or like materials.

One of the features of the present invention resides in the provision of apparatus wherein the heated material is continuously deposited upon the surface of a revolving roll maintained at a predetermined temperature, means being associated with the roll for carrying the material upon the roll surface from one end thereof to the other in the form of a plurality of separate, spaced, circularly moving relatively thin ribbons.

Another important feature of the invention resides in the provision of a plurality of plows so contrived as to agitate, disrupt and spread the material carried upon a tempering roll surface and to form said material into separate, spaced relatively thin ribbons, the material constituting the ribbons being progressively moved from one end of the tempering roll surface to the other end thereof.

Other objects, advantages and features of my invention will be apparent from the accompanying drawings and following detailed description.

In the drawings,

Fig. 4 is a fragmentary detailed sectional view showing the floating mounting and heater for the plow blades.

Fig. 5 is an enlarged detail plan view of a portion of the machine illustrating particularly the plow blades supporting structure with the cover housing removed.

Fig. 6 is an enlarged detailed sectional view taken on line 6—6 of Fig. 2.

Fig. 7 is an enlarged detailed perspective view of the scraper for the lower tempering roll.

Figure 1:
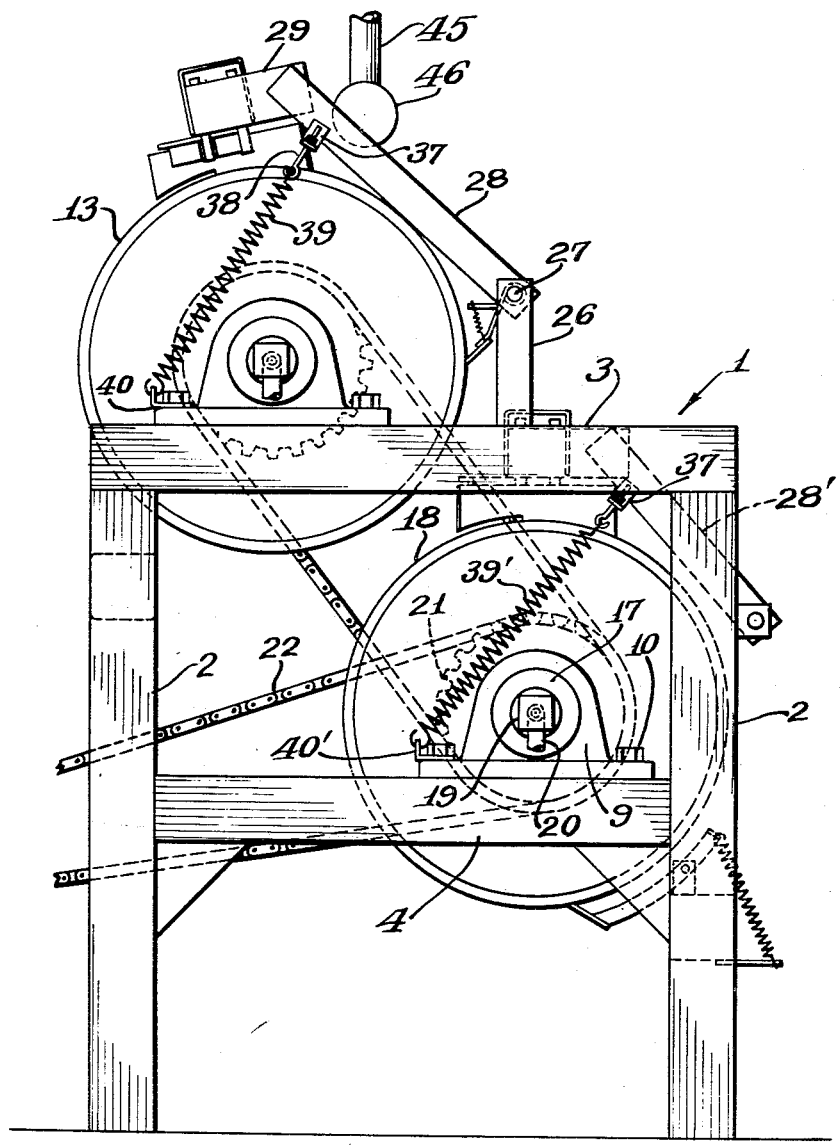
Fig. 1 is an end elevational view of my tempering device.

Referring in detail to the drawings, 1 indicates a frame comprising upright standards 2, upper cross members 3 disposed at each end of the frame and at the top portions of the standards 2, and intermediate cross members 4, one of which is disposed at each end of the frame. Longitudinal frame members 5 and 6 connect the standards 2 together. A bearing 7 is mounted on each of the opposite upper cross members 3, each of said bearings being secured to the upper portion of the respective cross member by means of screws or the like 8. A bearing 9 is positioned upon each of the intermediate cross members 4, said bearings being secured to the respective cross members by means of screws 10.

The bearings 7 upon the upper cross members 3 are disposed in alignment with each other and are adapted to support stub shafts 11. Referring particularly to Fig. 6, each stub shaft 11 is secured to an end 12 of a tempering roll 13, the roll being hollow. Each stub shaft 11 is provided with a central bore 14' which opens into the hollow interior of the roll 13, a pipe 14 being positioned in said bore and at its outer end carrying a fitting 15 into which a pipe 16 also connects. Each of the stub shafts 11 are similar, the arrangement being such that a tempering fluid may be introduced into and circulated through the interior of the roll 13.

A similar stub shaft 17 is journaled in each of the bearings 9, the stub shafts 17 being connected to the ends of a hollow tempering roll 18. The stub shafts 17 are hollow and a pipe fits thereinto in the same fashion that pipe 14 fits into bore 14'. Each of the pipes leading from sub shafts 17 connects with a fitting 19 similar to the fittings 15 and each of the fittings 19 is connected to a pipe 20, one of which functions as an inlet and an opposite pipe functioning as an outlet. The arrangement is similar to that heretofore described in conjunction with roll 13, that is, that a tempering liquid may be introduced into and circulated through the hollow tempering roll 18.

A sprocket wheel 21 is mounted upon one of the stub shafts 17 and a sprocket chain 22 is trained around the sprocket wheel 21, the sprocket chain being also trained around a sprocket wheel carried by a suitable prime mover (not shown) whereby drum 18 may be rotated. A second sprocket wheel 23 is also mounted upon the same stub shaft which carries sprocket wheel 21 and a sprocket wheel 24 is similarly mounted upon one of the stub shafts 11. A sprocket chain 25 is trained around sprocket wheels 23 and 24 whereby rotation of drum 18 results in rotation of drum 13, the sprocket wheels 23 and 24 being of the same diameter and hence the rotational speeds of drums 18 and 13 being equal. It will also be noted that when the drum 18 is driven by sprocket wheel 22 that drum 13 will also rotate in the same direction.

A pair of brackets 26 are mounted upon the upper cross members 3, one bracket being carried by each cross member, and a rod 27 is carried at its ends by said brackets. The brackets 26 are spaced laterally from drum 13 and adjacent each end of rod 27 an arm 28 is mounted, said arms being pivoted upon rod 27 and being normally inclined toward the upper portion of drum 13 adjacent its ends. A plate 29 is rigidly mounted at the end of each arm 28 and each plate is secured, by welding or the like, to the ends of a pair of channel irons 30. The channel irons 30 are disposed in parallel relationship to each other with their webs 31 spaced from each other and with their flanges 32 extending in opposite directions.

Referring particularly to Figs. 4 and 5, the flanges 32 of each of the channel irons 30 are provided with a plurality of spaced apertures. The apertures provided in the upper flange of each channel iron are disposed in alignment with the apertures provided in the lower flange of said channel, and the corresponding apertures in the flanges of one channel iron being staggered with respect to the apertures in the opposite channel iron. Thus, a plurality of aligned pairs of spaced apertures are provided in the flanges of each channel iron which are offset or staggered with respect to a similar number of aligned pairs of spaced apertures in the flanges of the other channel iron.

A rod 33 is axially, slidably positioned in each of said apertures, between the upper and lower flanges, and carries a collar 34 rigidly secured to an intermediate portion of the rod. A coil spring 35 embraces each rod and is confined between a collar 34 and an upper flange 32, whereby each of said rods is positioned in a floating relationship with respect to the channel iron which carries it.

A plow blade 36 is secured to each offset pair of rods 33 whereby the plane of each blade is angularly disposed with respect to the length of the channel irons and all the blades are disposed in spaced plane-parallel relationship to one another. In operation, the arms 28 hold the channel iron assembly, hereinbefore described, above drum 13, each arm carrying a lug 37 which is adapted to receive the shank of an adjusting link 38. A coil spring 39 is anchored at one end upon link 38 and at its opposite end is anchored upon a lug 40, the arrangement being such that the lower edge portions of blades 36 are resiliently urged by springs 39 into contact with the surface of drum 13. In view of the fact that channels 30 are disposed parallel to the axis of drum 13, the planes of the spaced blades 36 are disposed at an angle to the axis of the drum.

A plurality of angle irons 41 are rigidly carried upon the lower flanges of the channel irons 30, each angle iron being disposed with one of its flanges parallel and adjacent a portion of each blade 36. As will be hereinafter more fully described, the plow blades 36, during use function to divert the passage of plastic material, such as chocolate, carried upon the surface of drum 13 and in doing so, said blades are subjected to considerable lateral stress. The angle irons disposed adjacent the blade surfaces function to reinforce the blades. Thus, relatively thin plow blades may be employed, which, as will more fully appear hereinafter, is advantageous.

It will be noted, with particular reference to Fig. 4, that the general contour of the lower edge of each blade 36 is arcuate, conforming substantially to the radius of curvature of the drum 13. It will also be noted that the lower edge of each blade has a portion 42 which rides upon the surface of drum 13 and adjacent portion 43 which is radially offset from the portion 42 and is thus separated from the drum surface by the space 44. As will be hereinafter more fully described, this is an important feature of my invention since the characteristic treatment of the material to be tempered is brought about principally by this expedient.

The assembly hereinbefore described, that is, arms 28, channel irons 30, rods 33, blades 36 and reinforcing angles 41 appurtenant to drum 13 is duplicated in its entirety with respect to drum 18 and without further detailed description of the latter corresponding parts will be designated with corresponding prime reference numerals.

Only one essential difference exists, not in the physical assemblies themselves, but in the relationship of the blades to the axis of the drums 13 and 18, respectively. It will be noted, particular reference being made to Fig. 2, that the angular relationship of the blades 36 to drum 13 is opposite to that of blades 36' to drum 18. The reason for this resides in the fact that the material being tempered is charged to the surface of drum 13 at one end and is discharged from the drum surface at the opposite end whereat it is charged to the surface of drum 18 at the adjacent end and discharged from the surface of drum 18 at the opposite end. Thus the material is caused to move oppositely on drums 13 and 18 and inasmuch as the relative inclinations of the blades considered with the direction of rotation of the drums determines the direction of movement of the material and the drums rotate in the same direction, the blades are oppositely inclined to cause the movement desired.

Of course, if the same movement described above were desired and the drums were rotated in opposite directions, the blades 36 and 36' would be inclined in the same direction. Either of these combinations is contemplated in the present invention.

Figure 3:
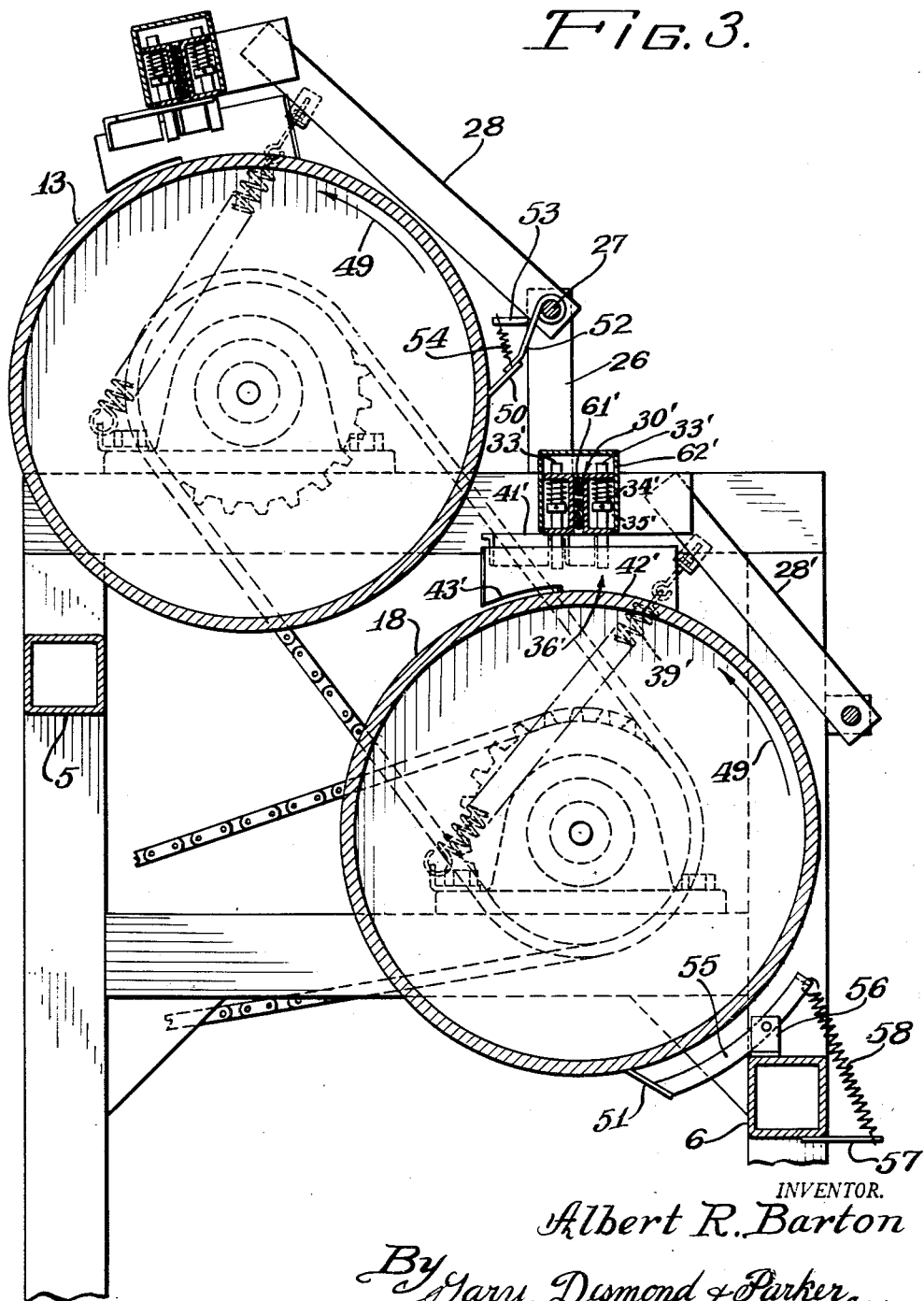
Fig. 3 is a transverse sectional view taken on line 3—3 of Fig. 2.

A feed pipe 45, adapted to carry the material to be tempered, is positioned above drum 13 adjacent one end thereof. A distributing head 46 is carried on the end of nipple 47 which connects with the feed pipe 45, said head being of enlarged cross-section relative to the nipple and being provided with a plurality of spaced apertures 48 from which material to be tempered is continuously discharged, the material dropping to the surface of drum 13. With the plow blade arrangement shown, the drums 13 and 18 are driven in the direction indicated by the arrows 49 in Fig. 3, and, hence, the material discharged is discharged upon the drum surface immediately in front of the first series of plow blades 36.

As will be hereinafter described the material to be tempered, discharged from the head 46 and deposited upon drum 13, is carried by said drum as a plurality of spaced ribbons to the opposite end of the drum. At this end of the drum a scraper blade 50 bears against the surface of the drum and continuously removes the material from said drum, the removed material dropping upon the upper surface of drum 18. Upon drum 18 the material is carried to its opposite end and is removed by scraper blade 51 which bears against the surface of the drum. The material is thereby removed from the tempering device as properly tempered material and may be caught by a suitable receptacle or conveyor (not shown) whereby it may be removed for further processing.

The scraper blade 50 is carried by a swinging arm 52 pivotally carried upon rod 27, a peg 53 being carried by the bracket 26 adjacent the discharge end of the drum 13, said peg serving as an anchorage for coil spring 54, the opposite end of which is secured to arm 52, whereby the blade 50 is resiliently urged into contact with the drum surface. The blade 51 is carried at the end of a curved plate 55 which is pivoted intermediate its length upon lugs 56 which, in turn, are mounted upon frame member 6. A peg 57 is carried upon the frame member 6 and serves as an anchorage for coil spring 58, the opposite end of which is secured to plate 55.

For purposes of illustration, chocolate will be considered as the material to be tempered. In the processing of chocolate for candy or confectionery purposes the chocolate is mixed with sugar and other ingredients, the mixing taking place at elevated temperatures. In using the chocolate for purposes of coating creams, nuts or other cores or centers and in other uses of the chocolate to form various kinds of confections, the heated cholate mixture must be reduced in temperature from the mixing temperature. The temperature-reducing operation or tempering must be carried out under carefully controlled conditions so as not to induce undue crystallization of the ingredients of the mixture. In addition, in the interest of economy of operation it is desirable that the operation be carried out in as short a time possible and with a minimum of personal attention and upon apparatus which is not susceptible to being broken, for example, if the chocolate stiffens unduly, and upon apparatus which can readily be cleaned and upon which the chocolate may be readily inspected and observed during the tempering period. Further, the chocolate or other material being tempered being on the outside of the drums, can have its temperature measured at substantially any place during its travel with the greatest convenience.

In tempering chocolate upon the device embodying the present invention, the chocolate or chocolate mixture is continuously charged to the surface of one end of the drum 13. The head functions to uniformly spread the initially discharged chocolate over a predetermined portion of the drum surface, the head preventing undesired maldistribution of the chocolate and also preventing splashing or spraying of the chocolate upon leaving the discharge pipe 45 which conveys the chocolate from the tanks (not shown) in which the chocolate and other ingredients may be mixed.

During the operation of the device, the drums 13 and 18 are continuously driven, rotating in the direction indicated by the arrows 49. Hence, the chocolate mixture being in an adherent condition even though at an elevated temperature clings to the drum surface and is carried toward the plow blades 36. It can be seen that the chocolate thus carried moves into contact with those portions of blades 36 wherein the edges 42 ride upon the drum surface. By virtue of the fact that the chocolate upon the drum moves circularly with the drum surface and the blades 36 are inclined to the circular path of movement, the chocolate, upon contacting the blades is shifted longitudinally along the roll surface from left to right, as viewed in Fig. 2. This shifting of the chocolate occurs, however, only over that portion of the arc of the drum spanned by the contacting edges 42. When the shifted chocolate encounters those portions of the blades wherein the edge 43 are radially spaced from the drum surface the major portion of the chocolate thus shifted squeezes under the edges 43 through the spaces 44, and is spread or trowelled upon the drum surface in the form of a thin mass. In view of the fact that this action is continuous the material moving through each space 44 is formed as a relatively thin ribbon 59, each ribbon being carried around on the surface of the drum in a circular path until each ribbon again moves under the plow-blade assembly whereby each ribbon is again disrupted and agitated and shifted longitudinally of the drum and emerges from the space of the next adjacent blade space as a ribbon.

In this fashion, the mass of chocolate being formed as relatively thin ribbons has a relatively large volume of chocolate brought into contact with a relatively large area of drum surface. This relationship of the chocolate mass to the drum surface facilitates the cooling or tempering of the mass. In addition, in order to uniformly cool the entire volume of the mass, at each longitudinal shift of the ribbon 59, the ribbon is disrupted by the scraping action of the edge 42 and the ribbon is reformed in the space 44. In this fashion, during the operation, all portions of the mass are brought into contact with the drum surface. In addition, many materials which may be tempered may have ingredients which tend to separate or stratify and, hence, by virtue of the repeated disrupting, spreading and trowelling action of the blades the ingredients of the material will be prevented from separating out or stratifying, the sequence being a period of quiescence while in ribbon form; disruption of the ribbon and spreading of the new ribbon; disruption of the new ribbon; etc., the sequence of disruption and reforming of the ribbons being repeated throughout the entire operation.

It will be noted that the ribbons 59 are spaced from each other by the space 60 which is desirable so as to control the thickness of each ribbon, preventing overlapping of adjacent edges of adjacent ribbons. This control is exercised by proportioning the lengths of the edges 42 to the edges 43, the space 60 being substantially equal to the axial projection of the difference in length between edges 42 and 43. Of course, it is contemplated that the lengths of the edges 42 and 43 be proportioned as desired.

In addition, for a predetermined drum speed, the rate that the chocolate moves longitudinally of the drum may be controlled by the angle of inclination of the blades 36, the lesser the angle of inclination of the blades to the axis of the drum the greater will be the movement of the mass longitudinally of the drum, and vice versa. The length of the contacting edge of each blade is also a factor in the longitudinal rate of movement of the mass along the length of the roll, that is, for a greater length of edges 42 a greater rate of movement will take place and vice versa. In general, the rate of movement of the mass along the length of the drum is a function of the projected length on the axis of the drum of the contacting edges 42. Of course, the rate is also a function of drum speed and it is contemplated that a variable speed drive may be employed to drive the drums.

Figure 2:
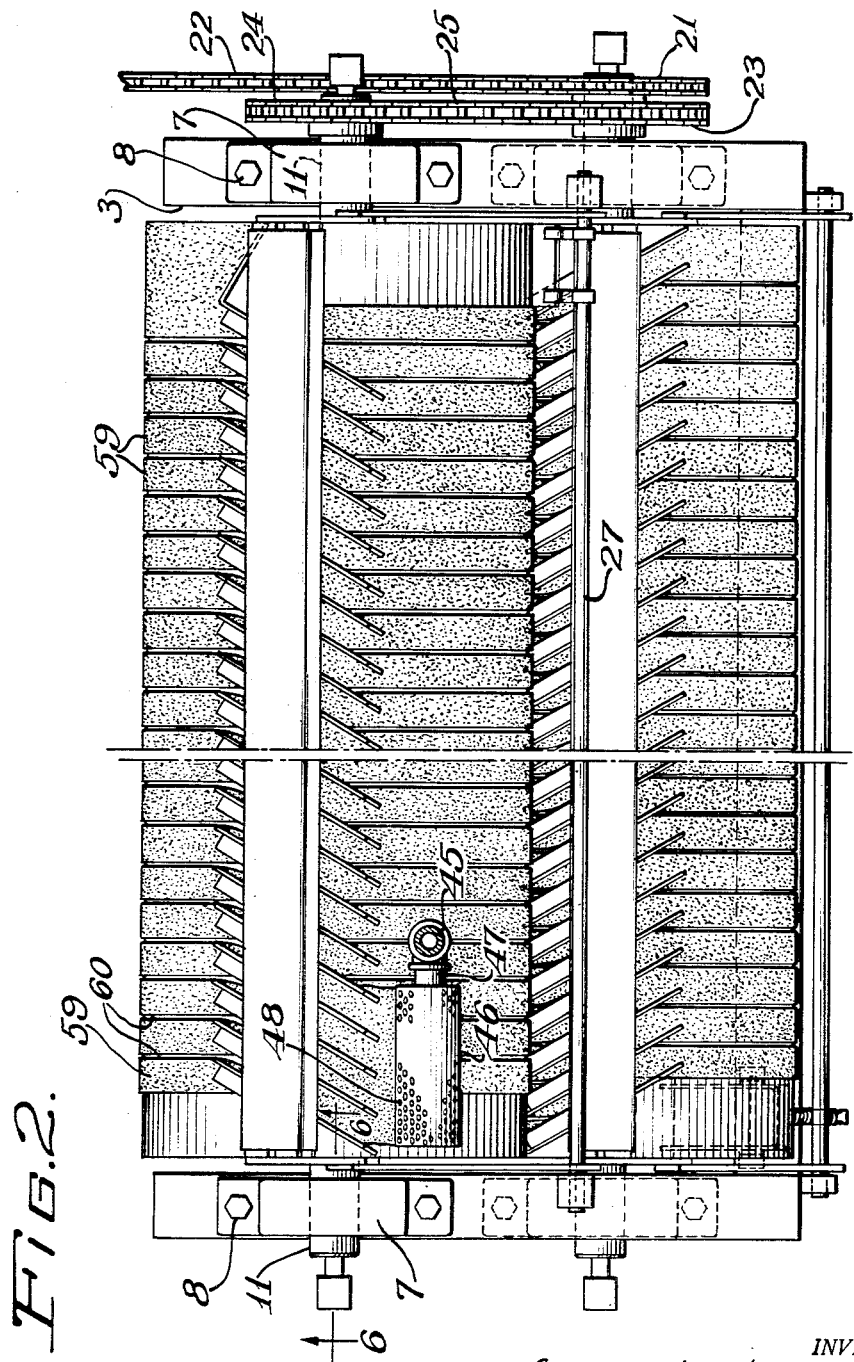
Fig. 2 is a top plan view of the device shown in Fig. 1.

The last ribbon 59 formed upon the drum 13, that is, the endmost ribbon adjacent the right end of drum 13, as viewed in Fig. 2, is removed from the drum surface by the scraper blade 50, the chocolate thus scraped from the surface of drum 13 falling downwardly onto the surface of drum 18. The chocolate thus deposited upon the drum 18 is engaged by the plow blade assembly associated with said drum and a plurality of coaxial ribbons are formed which are periodically displaced longitudinally of the drum as they pass into contact with the blades 36'. In this fashion the chocolate moves longitudinally upon the surface of drum 18 and since the blades 36' are inclined oppositely to blades 36 and since the drums 13 and 18 rotate in the same direction, the material moves oppositely upon the surface of drum 18, that is, from right to left, as viewed in Fig. 2.

At the end of its travel on the surface of drum 18, the material is scraped from the surface of the drum by scraper blade 51 and the material may drop to a suitable receptacle or upon a conveyor (not shown) whereby it is available for further processing in the making of the confectionery.

Of course, during the manipulations hereinbefore described, a tempering fluid or liquid may be passed into and through the drums 13 and 18 through the pipes provided therefor. The temperature of the tempering fluid will be determined by the nature of the material being treated and the temperature of the tempering fluid in each drum may be the same or different depending upon the result intended to be accomplished.

If a material is treated which may tend to readily congeal, the blades 36 and 36' may be heated so as to prevent the congealed material from accumulating upon said blades. To heat the blades conveniently, electrical heating elements 61, 61' may be positioned between the opposed webs 31 and 31' whereby by conduction the heat from the heating elements may be transferred to the blades 36 and 36'.

To protect the rods 33, 33', springs 35, 35' and heating elements 61, 61' from splashed material being treated or from dirt and debris a cover 62, 62' may be removably positioned over said members, the covers embracing the channel irons 30, 30'.

Although my invention has been described in conjunction with its use on chocolate, it is, of course, obvious that other materials in a plastic condition may be tempered upon the device, that is, any material which is sufficiently plastic to be spread or trowelled upon the surfaces of the drums in the manner hereinbefore described and which may require periodic agitation, and wherein large surface area contact between the tempering drum and the material to effect efficient heat interchange may be desirable.

It is to be understood that many modifications of my invention may be made without departing from the spirit of the invention and, hence, the invention is not to be limited except as necessitated by the appended claims.

I claim as my invention:

1. A tempering device for material in plastic condition which comprises, a hollow rotatable drum, means for circulating a tempering fluid through said drum, means for carrying a plurality of spaced parallel plow blades in a row extending parallel to the axis of the drum adjacent the outer surface of the drum, each of said plow blades extending in a plane inclined to the axis of the drum, the lower edge of each plow blade being of arcuate shape and having a substantial portion thereof in substantial contact with the surface of the drum whereby material deposited upon the surface of the drum at one end thereof is shifted during the tempering thereof on the drum surface by said plow blades along said drum surface during a portion of the circular travel of the material upon the drum surface.

2. A tempering device as set forth in claim 1 and having means for separately heating said plow blades.

3. A tempering device as set forth in claim 1 having resilient means for normally urging said lower edges of the plow blades into contact with the surface of the drum.

4. A tempering device for a material in plastic condition which comprises, a hollow rotatable drum, means for circulating a tempering fluid through said drum, means for depositing a material to be tempered in plastic condition on the surface of the drum adjacent one end thereof, means disposed adjacent said drum for forming the material on the surface of the drum into a relatively thin, relatively narrow ribbon with its longitudinal axis extending circularly around the entire circumference of said drum surface, and means in substantial circumferential contact with said drum surface for shifting the material comprising said ribbon laterally with respect to its circular path and longitudinally toward the opposite end of said drum while said material remains on said drum surface.

5. A tempering device for a material in plastic condition which comprises, a hollow rotatable drum, means for circulating a tempering fluid through said drum, means for depositing a material to be tempered in plastic condition on the surface of the drum adjacent one end thereof, a plurality of plow blades, means for carrying said plow blades in spaced substantially plane parallel relationship to each other adjacent the outer surface of the drum, said plow blades being disposed in a row substantially parallel to the axis of the drum and being disposed with their planes at an angle to the surface of the drum and inclined to the length of the drum, each of said blades having an edge adjacent the drum surface which conforms substantially with the curvature of said drum surface, a portion of said edge of each blade being in substantial contact with the drum surface to shift said material longitudinally upon said drum, and a portion of said edge of each blade being spaced from said drum surface to form said material into a relatively flat elongated ribbon during a portion of the circular travel of said material on the drum surface.

6. A tempering device for a material in plastic condition which comprises, a hollow rotatable drum, means for circulating a tempering fluid through said drum, means for depositing a material to be tempered in plastic condition on the surface of the drum adjacent one end thereof, frame means carried adjacent said drum and disposed substantially parallel thereto, a plurality of plow blades carried by said frame means in spaced substantially parallel relationship to each other and adjacent the surface of the drum, each of said plow blades extending in a plane inclined to the axis of the drum, the lower edge of each plow blade being of arcuate shape and having a substantial portion thereof in substantial contact with the drum surface, each of said plow blades comprising means for forming said material into a relatively flat, elongated ribbon during a portion of the circular travel of said material on the drum surface and means for shifting the ribbon longitudinally upon said drum surface during another portion of the circular travel of said ribbon.

7. A tempering device for a material in plastic condition which comprises, a hollow rotatable drum, means for circulating a tempering fluid through said drum, means for depositing a material to be tempered in plastic condition on the surface of the drum adjacent one end thereof, frame means carried adjacent said drum and disposed substantially parallel thereto, a plurality of plow blades carried by said frame means in spaced parallel relationship to each other and adjacent the surface of the drum, each of said plow blades extending in a plane inclined to the axis of the drum and having a substantial portion of its lower edge in circumferential contact with the surface of the drum, each of said plow blades comprising means for flattening said material into a relatively thin, elongated ribbon during a portion of the circular travel of said material on the drum surface and means for disrupting and shifting longitudinally a ribbon formed by a previous plow blade, said plow blades being adapted to repeat the formation and disrupting and shifting operation throughout the length of the drum.

8. A tempering device for a material in plastic condition which comprises, a hollow rotatable drum, means for circulating a tempering fluid through said drum, means for depositing a material to be tempered in plastic condition on the surface of the drum adjacent one end thereof, frame means carried adjacent said drum and disposed substantially parallel thereto, a plurality of plow blades carried by said frame means in spaced substantially parallel relationship to each other and adjacent the surface of the drum, said plow blades being disposed with their planes at an angle to the drum surface and inclined to the length of the frame means, each of said plow blades comprising means for forming said material into a relatively flat elongated ribbon during a portion of the circular travel of said material on the drum surface, means for shifting the material comprising a ribbon longitudinally upon said drum surface during another portion of the circular travel of said ribbon and heating means carried upon said frame means in heat conductive relationship with said plow blades to heat said plow blades.

9. A tempering device for a material in plastic condition which comprises, a pair of hollow continuously rotating drums mounted one above the other, means for circulating tempering fluids through said drums, means for depositing a material to be tempered in plastic condition on the surface of the upper drum adjacent one end thereof, means for discharging material from the opposite end of the upper drum to the surface at one end of the lower drum, means disposed adjacent each drum surface for forming plastic material carried on the drum surfaces into relatively thin, relatively elongated ribbons, and means in contact with the surfaces of said drums for shifting the material comprising said ribbons laterally with respect to the circular paths of said ribbons on said drum surfaces and longitudinally toward the ends of said drums opposite from the ends initially receiving said material, and means for removing said material from the surface of the lower drum at the end thereof opposite the end at which it is received from the upper drum.

10. A method of tempering a material in plastic condition which comprises, continuously depositing said material upon a drum surface adjacent one end thereof, rotating said surface, passing a tempering fluid into heat interchange relationship with said surface, forming the plastic material as a relatively thin elongated ribbon upon said surface in surface contact therewith, disrupting said ribbon on said drum surface and spreading the disrupted mass to reform the same periodically while continuously maintaining said ribbon upon said surface and while carrying said material upon said surface toward the opposite end thereof.

11. A method of tempering chocolate in plastic condition which comprises continuously depositing a mass of said plastic chocolate upon a continuously rotating surface adjacent one end thereof, said surface being in heat interchange relationship to a tempering fluid, causing said mass during the rotation of said surface to be moved forwardly on said surface toward the opposite end thereof, and during said forward movement of the mass from the first-named end of said surface toward said opposite end thereof, causing it to be sequentially and repeatedly formed on said surface into relatively thin ribbons, to have said ribbons disrupted, and the disrupted mass to be re-formed into other ribbons on said surface.

References Cited in the file of this patent

UNITED STATES PATENTS

| 1,012,578 | Andrews | Dec. 26, 1911 |
| 2,001,084 | Walter | May 14, 1935 |
| 2,612,832 | Wiemer | Oct. 7, 1952 |